United States Patent
Kawaharada

(10) Patent No.: US 7,899,117 B2
(45) Date of Patent: Mar. 1, 2011

(54) APPARATUS AND METHOD FOR ENCODING MOTION VECTOR, AND PROGRAM AND MEDIUM THEREFOR

(75) Inventor: Makoto Kawaharada, Osaka (JP)

(73) Assignee: Panasonic Corporation, Osaka (JP)

( * ) Notice: Subject to any disclaimer, the term of this patent is extended or adjusted under 35 U.S.C. 154(b) by 1653 days.

(21) Appl. No.: 11/133,366

(22) Filed: May 20, 2005

(65) Prior Publication Data

US 2005/0265455 A1    Dec. 1, 2005

(30) Foreign Application Priority Data

May 26, 2004    (JP)    ............... 2004-155828

(51) Int. Cl.
  *H04N 7/12*    (2006.01)
  *H04N 11/02*   (2006.01)
  *H04N 11/04*   (2006.01)
  *H04B 1/66*    (2006.01)

(52) U.S. Cl. ............................... 375/240.16

(58) Field of Classification Search ............ 375/240.16, 375/240.22
  See application file for complete search history.

(56) References Cited

U.S. PATENT DOCUMENTS 6,091,460 A * 7/2000 Hatano et al. ............... 348/699
6,128,342 A * 10/2000 Kikuchi et al. ......... 375/240.12
6,724,821 B1 * 4/2004 Sawada ................. 375/240.16
7,372,906 B2 * 5/2008 Bolton .................... 375/240.2

FOREIGN PATENT DOCUMENTS

JP    2001-197492    7/2001
JP    2002-209216    7/2002

* cited by examiner

*Primary Examiner*—Nhon T Diep
(74) *Attorney, Agent, or Firm*—Bacon & Thomas, PLLC

(57) ABSTRACT

A motion vector encoding apparatus includes a detection unit for detecting motion vectors of respective blocks of a predetermined size and a range of the motion vectors; a first storage unit for storing therein the detected motion vectors; and a generation unit for generating motion vector predictors from the motion vectors outputted from the first storage unit. The apparatus also includes a calculation unit for calculating an average value of differential vectors between the motion vectors outputted from the first storage unit and the motion vector predictors. Moreover, the apparatus includes a determination unit for determining a parameter representing a motion vector encodable range based on the average value of the differential vectors calculated by the calculation unit; and an encoding unit for encoding the motion vectors based on the differential vectors and a parameter representing an encodable range outputted from the determination unit.

5 Claims, 3 Drawing Sheets

APPARATUS AND METHOD FOR ENCODING MOTION VECTOR, AND PROGRAM AND MEDIUM THEREFOR

FIELD OF THE INVENTION

The present invention relates to an apparatus and a method for encoding a motion vector (hereinafter, simply referred to as an MV) during video compression encoding.

BACKGROUND OF THE INVENTION

With regard to video compression encoding, encoding of an MV is generally carried out by encoding a difference between the MV and an MV predictor, thereby reducing a code length assuming that the MV predictor is almost exact. Depending on scenes, however, there occurs a problem that the MV predictor considerably differs from the MV, which results in an increase of the MV code length. In an MPEG (moving picture expert group), encoding of the MV involves calculating a differential vector between the MV and the MV predictor that is determined in accordance with a certain method; and encoding the differential vector. The differential vector can be expressed by scaling a basic differential vector using a scale factor and adding a residual vector to the scaled result. With a scale factor code f_code that determines an encodable range of MV, the scale factor can be expressed as (1<<(f_code−1)). That is, the encodable range of MV is of a size proportional to $2^{f\_code}$. The basic differential vector is encoded in VLC (variable length coding) while the residual vector is encoded in FLC (fixed length coding). Depending on the f_code, the code length can be varied even for a same differential vector.

The f_code may be determined for every picture. It is possible to employ the minimum f_code value that includes the maximum and minimum values of MV components of a picture.

Moreover, it is also possible to extract the maximum differential value among differential values for MVs of respective macroblocks (MB) in a picture and to employ a minimum f_code value that can express the maximum differential value (see, for example, Japanese Patent Laid-open Application No. 2001-197492).

Further, it is still possible to obtain all MVs of a picture from inputted image processing information, and prevent an excessive increase of MV code length based on the maximum value of the MV components and the correlation value of the MVs (see, for example, Japanese Patent Laid-open Application No. 2002-209216).

In the above methods, however, it is impossible to determine a scale factor until all of the MVs of the picture are detected.

That is, the above-described conventional methods have a problem in that, in encoding a certain picture, an f_code cannot be determined to reduce an MV code length unless all the MVs of the picture are calculated.

SUMMARY OF THE INVENTION

It is, therefore, an object of the present invention to provide an MV encoding method capable of determining an f_code for reducing an MV code length by way of utilizing past MV information, prior to encoding MVs of a to-be-encoded picture.

In accordance with a preferred embodiment of one aspect of the invention, there is provided a motion vector encoding apparatus including: a detection unit for, upon receipt of a to-be-encoded picture and a reference picture, detecting motion vectors of respective blocks of a predetermined size and a range of the motion vectors; a first storage unit for storing therein the motion vectors detected by the detection unit; a generation unit for generating motion vector predictors from the motion vectors outputted from the first storage unit; a calculation unit for calculating an average value of differential vectors between the motion vectors outputted from the first storage unit and the motion vector predictors outputted from the generation unit; a determination unit for determining a parameter representing a motion vector encodable range based on the average value of the differential vectors calculated by the calculation unit; and an encoding unit for encoding the motion vectors based on the differential vectors and a parameter representing an encodable range outputted from the determination unit.

In accordance with another preferred embodiment of the aspect of the invention, there is provided a motion vector encoding apparatus including: a preliminary detection unit for, upon receipt of a to-be-encoded picture and a reference picture, detecting motion vectors of portions of the to-be-encoded picture; a first storage unit for storing therein the motion vectors detected by the preliminary detection unit; a generation unit for generating motion vector predictors from the motion vectors stored in the first storage unit; a calculation unit for calculating an average value of differential vectors between the motion vectors stored in the first storage unit and the motion vector predictors generated by the generation unit; a second storage unit for storing therein maximum and minimum values of the motion vectors stored in the first storage unit; a determination unit for, based on the maximum and minimum values of the motion vectors stored in the second storage unit and the average value of the differential vectors calculated by the calculation unit, outputting a parameter representing a motion vector encodable range and a search range that includes the maximum and minimum values of the motion vectors; a main detection unit for detecting motion vectors of respective blocks of a predetermined size based on the to-be-encoded picture, the reference picture and the search range outputted from the determination unit; and an encoding unit for encoding the motion vectors detected by the main detection unit based on a parameter representing an encodable range determined by the determination unit.

In accordance with still another preferred embodiment of the aspect of the invention, there is provided a motion vector encoding apparatus including: a motion vector decoding unit that receives a video compression stream; a first storage unit for storing therein motion vectors decoded by the motion vector decoding unit; a generation unit for generating motion vector predictors from the motion vectors outputted from the first storage unit; a calculation unit for calculating an average value of differential vectors between the motion vectors outputted from the first storage unit and the motion vector predictors outputted from the generation unit; a determination unit for determining a parameter representing a motion vector encodable range based on the average value of the differential vectors calculated by the calculation unit; an encoding unit for encoding the motion vectors based on the differential vectors and a parameter representing an encodable range outputted from the determination unit; and a substitution unit for substituting a stream of the motion vectors encoded by the encoding unit for a motion vector portion of the video compression stream.

In accordance with a preferred embodiment of another aspect of the invention, there is provided a motion vector encoding method including: a detection step of, upon receipt of a to-be-encoded picture and a reference picture, detecting motion vectors of respective blocks of a predetermined size and a range of the motion vectors; a first storage step of storing the motion vectors detected in the detection step; a generation step of generating motion vector predictors from the motion vectors stored in the first storage step; a calculation step of calculating an average value of differential vectors between the motion vectors stored in the first storage step and the motion vector predictors generated in the generation step; a determination step of determining a parameter representing a motion vector encodable range based on the average value of the differential vectors calculated in the calculation step; and an encoding step of encoding the motion vectors based on the differential vectors and a parameter representing an encodable range determined in the determination step.

In accordance with another preferred embodiment of said another aspect of the invention, there is provided a motion vector encoding method including: a preliminary detection step of, upon receipt of a to-be-encoded picture and a reference picture, detecting motion vectors of portions of the to-be-encoded picture; a first storage step of storing the motion vectors detected in the preliminary detection step; a generation step of generating motion vector predictors from the motion vectors stored in the first storage step; a calculation step of calculating an average value of differential vectors between the motion vectors stored in the first storage step and the motion vector predictors generated in the generation step; a second storage step of storing maximum and minimum values of the motion vectors stored in the first storage step; a determination step of, based on the maximum and minimum values of the motion vectors stored in the second storage step and the average value of the differential vectors calculated in the calculation step, determining a parameter representing a motion vector encodable range and a search range that includes the maximum and minimum values of the motion vectors; a detection step of detecting motion vectors of respective blocks of a predetermined size based on the to-be-encoded picture, the reference picture and the search range determined in the determination step; and an encoding step of encoding the motion vectors detected in the detection step based on a parameter representing an encodable range determined in the determination step.

In accordance with still another preferred embodiment of said another aspect of the invention, there is provided a motion vector encoding method including: a motion vector decoding step that receives a video compression stream; a first storage step of storing motion vectors decoded in the motion vector decoding step; a generation step of generating motion vector predictors from the motion vectors stored in the first storage step; a calculation step of calculating an average value of differential vectors between the motion vectors stored in the first storage step and the motion vector predictors generated in the generation step; a determination step of determining a parameter representing a motion vector encodable range based on the average value of the differential vectors calculated in the calculation step; an encoding step of encoding the motion vectors based on the differential vectors and a parameter representing an encodable range determined in the determination step; and a substitution step of substituting a stream of the motion vectors encoded in the encoding step for a motion vector portion of the video compression stream.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

A to-be-encoded picture may be a frame, field or the like. Hereinafter, preferred embodiments of the present invention will be described with respect to a case of a to-be-encoded frame. However, it should be noted that the present invention is not limited to the case of the to-be-encoded frame.

In accordance with the present invention, a scale factor capable of reducing an MV code length can be obtained based on past MV information before detecting MVs of the to-be-encoded frame. In this way, the MV code length can be reduced even for a same MV.

First Preferred Embodiment

Figure 1:
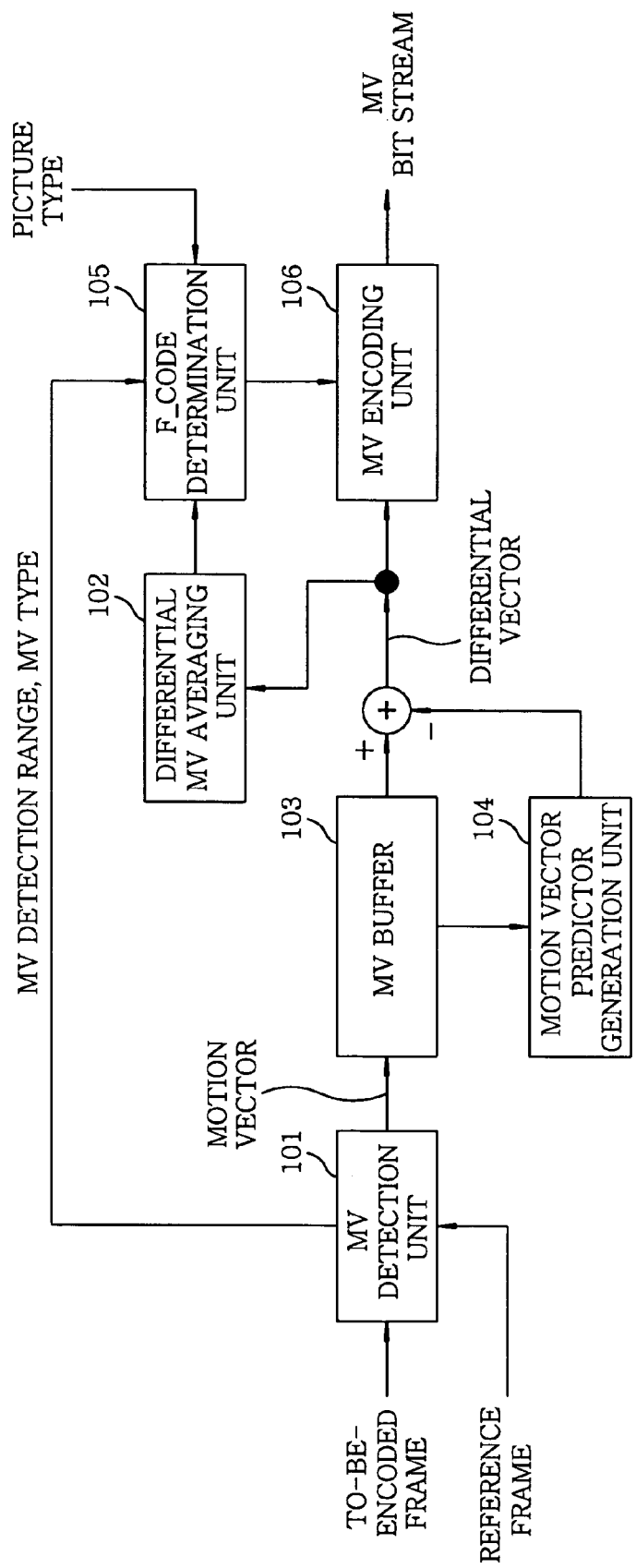
FIG. 1 is a block diagram of an MV encoding apparatus in accordance with a first preferred embodiment of the present invention.

With reference to FIG. 1, there is illustrated a configuration of an MPEG-based MV encoding apparatus in accordance with a first preferred embodiment of the present invention. Reference numeral 101 is an MV detection unit which receives a to-be-encoded frame and a reference frame inputted thereto, detects an MV within a predetermined vector search range (f_code) for every MB, and then outputs the detected MVs, the MV detection range and an MV type that indicates a forward vector type or a backward vector type. Reference numeral 103 represents an MV buffer for temporarily storing the MVs therein, and reference numeral 104 denotes an MV predictor generation unit for generating MV predictors from the MVs stored in MV buffer 103. Reference numeral 102 refers to a differential MV averaging unit that summates differential vectors for 1 frame, which represents differences between the respective MVs outputted from MV buffer 103 and the MV predictors outputted from MV predictor generation unit 104, and calculates an average differential vector for the 1 frame. Reference numeral 105 is an f_code determination unit that outputs an f_code to be used in encoding the MVs of the to-be-encoded frame. To be more specific, f_code determination unit 105 calculates a minimum value f_code1 that satisfies the MV detection range outputted from MV detection unit 101. It also calculates a value f_code2, based on the average differential vector for the 1 frame outputted from differential MV averaging unit 102, that produces a minimum MV code length of the average differential vector. If the f_code2 is greater than the f_code1, f_code determination unit 105 employs the f_code2 as an f_code; otherwise, it employs the f_code1 as the f_code. Then, f_code determination unit 105 stores the thus determined f_code with reference to the picture type and the MV type. Thereafter, the stored f_code may be used for outputting an f_code required for the MV encoding of a later to-be-encoded frame of the same type. Further, as an f_code for the MV encoding of the current to-be-encoded frame, there can be used an f_code that has been determined and stored with respect to a past to-be-encoded frame of the same type. In general, the distance between a B-picture (bi-directional predictive-coded picture)

and a reference picture in case of forward vector is different from that of backward vector. Therefore, the f_code is to be respectively stored with reference to the MV type. Furthermore, since the distance in case of MV detection of a P-picture (predictive-coded picture) is different from the distances in case of the B-picture, the f_code is to be respectively stored with reference to the picture type. Further, reference numeral 106 is an MV encoding unit that receives the f_code from f_code determination unit 105 and the differential vectors, and performs the MV encoding.

In accordance with the first preferred embodiment, MVs are detected within the motion compensation range corresponding to a past f_code. F_code1 is determined to include the detection range and f_code2 is determined to produce a minimum code length of an average value of prior differential vectors. Then, if the f_code2 is greater than the f_code1, the f_code2 is employed as an f_code to be used in the MV encoding unit to encode MVs; otherwise, the f_code1 is adopted as the f_code.

With the above configuration, the MV code length can be reduced without having to preserve all the MVs of the to-be-encoded frame or all the differential vectors thereof.

Second Preferred Embodiment

Figure 2:
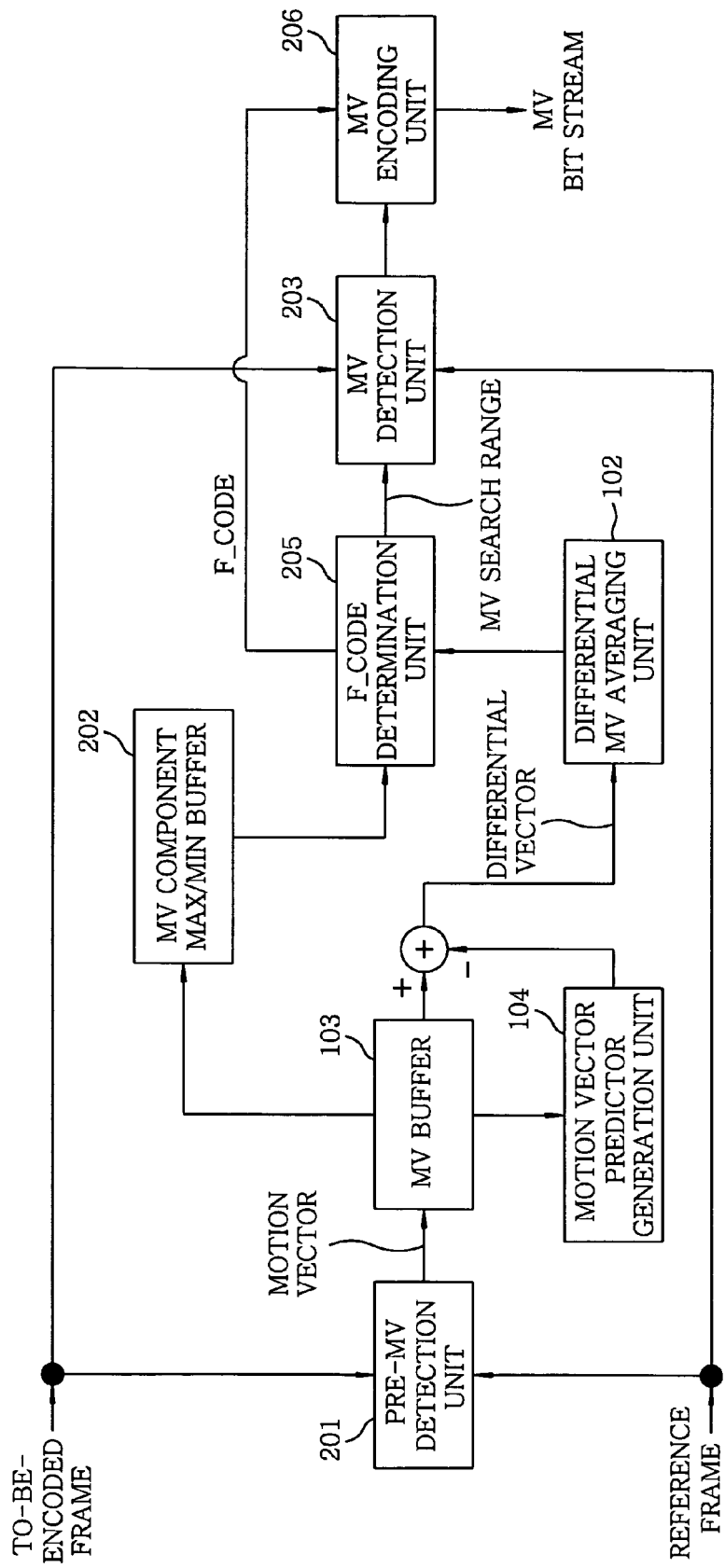
FIG. 2 sets forth a block diagram of an MV encoding apparatus in accordance with a second preferred embodiment of the present invention.

FIG. 2 illustrates a configuration of an MPEG-based MV encoding apparatus in accordance with a second preferred embodiment of the present invention. In FIG. 2, parts identical to those described in the first preferred embodiment will be assigned like reference numerals, and description thereof will be omitted. The difference between the first and the second preferred embodiments lies in that, in accordance with the second preferred embodiment, it is possible to obtain an f_code by utilizing detected MVs, thereby avoiding a delay caused by using the past f_code.

Reference numeral 201 is a pre-MV detection unit that is employed to determine an f_code by detecting MVs, that is, without deciding an MV search range from the past information. Pre-MV detector 201 receives a to-be-encoded frame and a reference frame inputted thereto, detects MVs of some MBs prior to the encoding, and outputs the detected MVs. Reference numeral 202 is a buffer for storing maximum and minimum values of components of the detected MVs received from MV buffer 103. Reference numeral 205 represents an f_code determination unit that receives the maximum and minimum values of the MV components and an average value of differential vectors inputted thereto, and outputs the f_code and an MV search range including the maximum and minimum values of the MV components. Further, reference numeral 206 is an MV encoding unit for encoding MVs, which are detected by MV detection unit 203, by using the f_code determined by f_code determination unit 205. To be more specific, f_code determination unit 205 determines a value f_code1 based on the maximum and minimum values of the MV components and determines a value f_code2 that produces a minimum code length of an average value of differential vectors. Then, if the f_code2 is greater than the f_code1, F_code detector 205 outputs the f_code2 as the f_code to be used in the encoding process of MV encoding unit 206; otherwise, it outputs the f_code1 therefor. Reference numeral 203 is an MV detection unit that receives the to-be-encoded frame, the reference frame and the MV search range, and detects an MV within the MV search range for each MB.

In accordance with the second preferred embodiment, prior to detecting all MVs of a to-be-encoded frame, another MV detection is performed in advance with respect to some MBs extracted at a predetermined interval. Further, an MV search range and an f_code are determined by f_code determination unit 205 based on maximum and minimum values of components of the MV and based on an average value of differential vectors. Then, by using the MV search range and the f_code, all the MVs of the to-be-encoded frame are detected and the encoding thereof is performed.

In the above configuration, only the maximum and minimum values of the vector components and the average value of the differential vectors need to be stored, which means that the MV code length can be reduced without a need to preserve all the MVs of the to-be-encoded frame or all the differential vectors thereof. Moreover, by determining the f_code after inspecting a tendency of MVs of a plurality of extracted MBs prior to detecting all the MVs of the to-be-encoded frame, it becomes unnecessary to consider the picture type.

Third Preferred Embodiment

Figure 3:
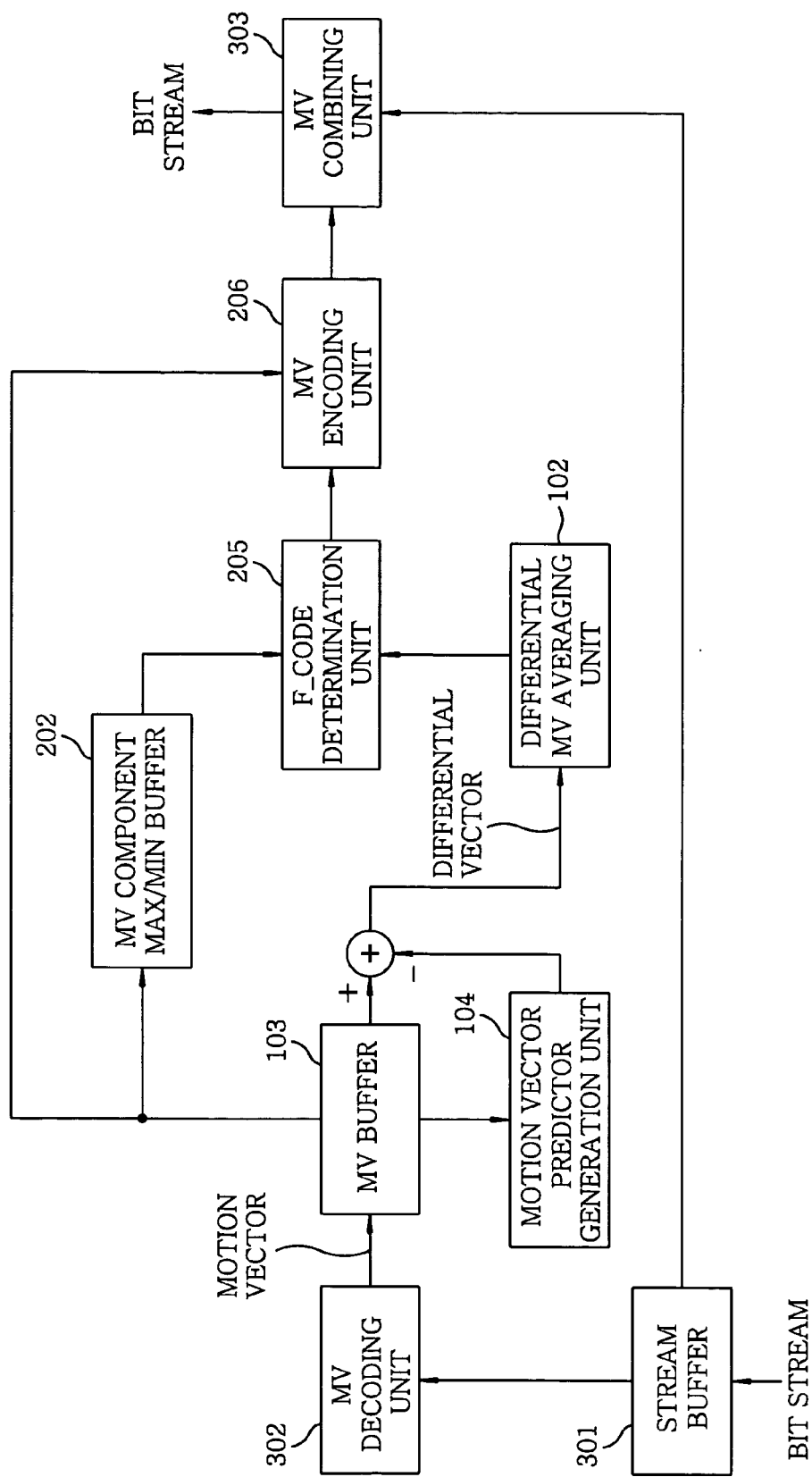
FIG. 3 presents a block diagram of an MV encoding apparatus in accordance with a third preferred embodiment of the present invention.

FIG. 3 illustrates a configuration of an MPEG-based MV encoding apparatus in accordance with a third preferred embodiment of the present invention. In FIG. 3, parts identical to those described in the first or the second preferred embodiment will be assigned like reference numerals, while omitting description thereof. Reference numeral 301 is a stream buffer of, e.g., a frame and reference numeral 302 represents an MV decoding unit that receives a stream from stream buffer 301 and decodes MVs thereof. Reference numeral 206 is an MV encoding unit for encoding the MVs of MV buffer 103 with an f_code determined by f_code determination unit 205. Further, reference numeral 303 represents a MV combining unit for substituting the encoded MVs outputted from the MV encoding unit 206 for the MVs of the stream.

In accordance with the third preferred embodiment, with regard to a previously encoded stream, MVs of the encoded stream are re-encoded with a newly determined f_code. With the above configuration, the MV code length of once encoded MVs can be reduced by changing the f_code and re-encoding the MVs with that.

Each of the above-described preferred embodiments of the present invention illustrates an MV encoding apparatus incorporated in a video compression encoding system. The video compression encoding system can also include various functional blocks for frame reordering, multiplexing, or the like. Further, though each of the preferred embodiments of the present invention has been described for the case of performing the MV encoding by using an apparatus, the same can be achieved by using software, i.e., a program. Further, the MV encoding or the video compression encoding can be performed by operating a system such as a microprocessor or a computer through the use of a medium in which the program is stored.

The encoding result, namely, the encoded data may be transmitted elsewhere or stored in a medium by using a recording apparatus, if necessary. Further, by inputting the encoded data into a decoding apparatus, original data can be restored.

The present invention is capable of suppressing a large increase of an MV code length even in case of a picture with a great motion and an inexact MV predictor by way of determining an f_code from MVs and the MV predictors.

While the invention has been shown and described with respect to the preferred embodiments, it will be understood by those skilled in the art that various changes and modification may be made without departing from the sprit and scope of the invention as defined in the following claims.

What is claimed is:

1. A motion vector encoding apparatus comprising:
   a detection unit for, upon receipt of a to-be-encoded picture and a reference picture, detecting motion vectors of respective blocks of a predetermined size and a range of the motion vectors;
   a first storage unit for storing therein the motion vectors detected by the detection unit;
   a generation unit for generating motion vector predictors from the motion vectors outputted from the first storage unit;
   a calculation unit for calculating an average value of differential vectors between the motion vectors outputted from the first storage unit and the motion vector predictors outputted from the generation unit;
   a determination unit for determining a parameter representing a motion vector encodable range based on the range of the motion vectors detected by the detection unit and the average value of the differential vectors calculated by the calculation unit; and
   an encoding unit for encoding the motion vectors based on the differential vectors and the parameter representing an encodable range outputted from the determination unit,
   wherein the determination unit determines as the parameter a first encodable range if the first encodable range is equal to or greater than a second encodable range, and determines as the parameter the second encodable range if the first encodable range is smaller than the second encodable range, the first encodable range including maximum and minimum values of the motion vectors detected by the detection unit and the second encodable range producing a minimum code length of the average value calculated by the calculation unit.

2. The apparatus of claim 1, wherein the determination unit stores the determined parameter with reference to a picture type and a motion vector type, and the stored parameter is used for a motion vector encoding of a later to-be-encoded frame of the same type.

3. A motion vector encoding method comprising:
   a detection step of, upon receipt of a to-be-encoded picture and a reference picture, detecting motion vectors of respective blocks of a predetermined size and a range of the motion vectors;
   a first storage step of storing the motion vectors detected in the detection step;
   a generation step of generating motion vector predictors from the motion vectors stored in the first storage step;
   a calculation step of calculating an average value of differential vectors between the motion vectors stored in the first storage step and the motion vector predictors generated in the generation step;
   a determination step of determining a parameter representing a motion vector encodable range based on the range of the motion vectors detected in the detection step and the average value of the differential vectors calculated in the calculation step; and
   an encoding step of encoding the motion vectors based on the differential vectors and the parameter representing an encodable range determined in the determination step
   wherein, in the determination step, a first encodable range is determined as the parameter if the first encodable range is equal to or greater than a second encodable range, and the second encodable range is determined as the parameter if the first encodable range is smaller than the second encodable range, the first encodable range including maximum and minimum values of the motion vectors detected in the detection step and the second encodable range producing a minimum code length of the average value calculated in the calculation step.

4. A non-transitory medium storing therein encoded data that is readable by a recording apparatus generated in accordance with the method of claim 3.

5. The method of claim 3, wherein the determination step includes storing the determined parameter with reference to a picture type and a motion vector type, the stored parameter being used for a motion vector encoding of a to-be-encoded frame of the same type.

* * * * *